United States Patent
Sointula

(10) Patent No.: US 7,333,446 B2
(45) Date of Patent: Feb. 19, 2008

(54) SPLIT-BAND, FILTER DUPLEXER ASSEMBLY, AND ASSOCIATED METHOD

(75) Inventor: Erkka Sointula, Salo (FI)

(73) Assignee: Nokia Corporation, Espoo (FI)

( * ) Notice: Subject to any disclaimer, the term of this patent is extended or adjusted under 35 U.S.C. 154(b) by 1428 days.

(21) Appl. No.: 10/135,738

(22) Filed: Apr. 30, 2002

(65) Prior Publication Data

US 2003/0202483 A1    Oct. 30, 2003

(51) Int. Cl.
*H04J 1/00* (2006.01)

(52) U.S. Cl. ...................................... 370/281; 370/295

(58) Field of Classification Search ................ 370/276, 370/277, 278, 279, 281, 282, 290, 291, 295
See application file for complete search history.

(56) References Cited

U.S. PATENT DOCUMENTS 5,919,212 A * 7/1999 Olson et al. ................... 607/5

* cited by examiner

*Primary Examiner*—Brenda Pham
(74) *Attorney, Agent, or Firm*—Alston & Bird LLP

(57) ABSTRACT

A duplexer filter assembly, and an associated method, for a communications device capable of operation at a frequency-band set. Separate duplexer filters, each formed of a transmit part and a receive part, are switchingly coupled to the communication circuitry of the communication device. A selected one, or the other, of the duplexer filters is connected to the communication circuitry by switch circuitry depending upon at which parts of the communication device is to be operated.

18 Claims, 4 Drawing Sheets

SPLIT-BAND, FILTER DUPLEXER ASSEMBLY, AND ASSOCIATED METHOD

The present invention relates generally to a manner by which to filter signals at a radio communication station, such as a cellular mobile station, generated during operation of a cellular, or other radio, communication system. More particularly, the present invention relates to a filter assembly, and an associated method, capable of split-band operation at disparate frequency-band of a frequency-band set. High levels of rejection between receive and transmit bands are achieved, in a duplexer assembly of small size, constructed to reduce, or obviate, the need for a guard band separating the frequency bands of the frequency-band sets.

BACKGROUND OF THE INVENTION

A communication system provides for communication of information between a sending station and a receiving station. The sending and receiving stations are connected by way of a communication channel upon which the information is transmitted by the sending station to the receiving station. If necessary, the information is first converted into a form to permit its communication upon the communication channel.

Many types of communication systems have been developed, implemented, and regularly utilized. And, new types of communication systems have been, and continue to be, developed and implemented as a result of advancements in communication technologies.

A radio communication system is representative of a type of communication system that has benefited from advancements in communication technologies. A cellular communication system is an exemplary type of radio communication system. Cellular communication systems have been installed to encompass significant portions of the populated areas of the world and are popularly utilized to communicate telephonically therethrough. Typically, a user is permitted access to the cellular communication system through purchase of a service subscription to communicate therethrough. The user, sometimes referred to as a subscriber, typically utilizes a portable radio transceiver, referred to as a mobile station, to effectuate communications by way of the cellular communication system. Mobile stations are typically constructed to mimic the operation of a conventional, wireline, telephonic station, providing full-duplex communications.

Successive generations of cellular communication systems have been developed and implemented. As advancements have permitted, improvements to existing systems have been implemented, and subsequent-generation systems have been installed.

First-generation cellular communication systems generally utilize analog communication schemes while subsequent-generation, communication systems generally utilize digital communication schemes. Second-generation cellular communication systems utilize various types of, generally, fixed-rate digital communication schemes. Examples of second-generation systems includes a GSM (General System for Mobile Communications) system and an IS-95. And, third-generation cellular communication systems also utilize digital communication techniques while further providing for multiple data rate communications. GSM/EDGE (GSM/Enhanced Data or GSM Evolution) and W-CDMA (Wide Band-CDMA) communication systems are exemplary of third-generation cellular communication systems.

Full-duplex communications are provided through the allocation of separate communication channels upon which to send information and to receive information, respectively. In at least several of the cellular communication systems, and of interest herein, are communication channels defined through the use of frequency division techniques. That is, the separate communication channels utilized to effectuate full-duplex communications are offset from one another in frequency within separate frequency bands.

Mobile stations constructed for use in such types of systems sometimes utilize duplexer filters. Duplexer filters used in such mobile stations are typically connected to the antenna transducer of the mobile station and include separate pass bands corresponding to the frequency bands at which the separate communication channels are defined. That is, the duplexer filter includes a receive portion of a first pass band centered about a first center frequency and a transmit filter portion having a second pass band centered about a second center frequency. The first and second pass bands are selected to correspond to the ranges that are defined in the communication system in which the mobile station is to be operable and are generally of non-overlapping frequencies.

A filter duplexer must exhibit high levels of rejection between the separate pass bands so that required linearity conditions are maintained. For instance, the duplexer filter must also be of band-reject characteristics such that a send signal, originated at the mobile station is not passed through the receive portion of the mobile station to be operated thereon, together with the intended receive signal.

At least one existing, cellular communication standard separates the frequency bands of the frequency-band set by a 20 MHz guard band.

Due to the popularity of usage of cellular communication systems to communicate therethrough, proposals have been set forth to allocate additional portions of the electromagnetic spectrum for cellular communications. For instance, portions of the 2.5 and 2.7 GHz frequency band are proposed to be 5 MHz extensions of the 1.9 GHz PCS band are proposed to be allocated for cellular communication. The 5 MHz extension would reduce the size of the guard band separating the bands of the frequency-band set. Such reduction necessitates corresponding change in the duplexer characteristics.

A mobile station operable in a cellular communication system implemented at the extended frequency bands needs to have a duplexer having split-band characteristics to permit appropriate operation of the mobile station at such frequency bands. And, because mobile stations are also constructed to be of increasingly miniaturized dimensions, size constraints prevent the increase in the dimensions of the duplexers.

A duplexer, capable of split-band operation at disparate frequency bands requiring minimal, or no, guard bands separating the frequency bands, that exhibits high levels of rejection, and is of small physical dimensions would therefore be advantageous.

It is in light of this background information related to filter duplexers that the significant improvements of the present invention have evolved.

SUMMARY OF THE INVENTION

The present invention, accordingly, advantageously provides an assembly, and an associated method, by which to filter signals at a radio communication station, such as a cellular mobile station, generated during operation of a cellular, or other radio, communication system.

Through operation of an embodiment of the present invention, a manner is provided by which to filter signals at a mobile, or other communication, station capable of split-band operation at disparate frequency-band sets.

High levels of rejection between, e.g., receive and transmit bands of a frequency-band are achieved. Small, or even no, guard bands are needed, thereby permitting increased usage of bandwidth allocated to the communication system operation. And, the duplexer is maintained in a package of a small package-size.

In one aspect of the present invention, a duplexer filter assembly is provided that exhibits pass bands at a frequency-band set. A first frequency band forms a transmit band, and a second frequency band forms a receive band. The filter assembly has separate parts defining sub-bands, or subsets of the frequency band set. And, a second set of frequency bands is centered, or otherwise associated with, separate transmit and receive bands allocated to a second, full-duplex, radio communication system.

In another aspect of the present invention, separate duplexer filters are selectably coupled to communication circuitry of a radio communication device. Selection of which of the duplexer filters is coupled to the communication circuitry is dependent upon in which of at least two frequency-band subsets in which the radio communication device is to be operable. When the radio communication device is to be operated to communicate upon channels of frequencies within a first frequency-band, subset, the first duplexer filter is caused to be coupled to the communication circuitry. And, if the radio communication device is operated to communicate upon channels of frequencies within a second frequency-based subset, the second duplexer filter is caused to be coupled to the communication circuitry.

In another aspect of the present invention, switching circuitry switchingly connects the appropriate duplexer filter to the communication circuitry. When the first duplexer filter is to be coupled to the communication circuitry, a switch element switchingly connects the first duplexer filter to the communication circuitry. And, when the second duplexer filter is to be coupled to the communication circuitry, the switch circuitry switchingly connects the second duplexer filter to the communication circuitry. The first and second duplexer filters are, for instance, connectible to the communication circuitry in the alternative. That is, one, or the other, of the duplexer filters is coupled, at any time, to the communication circuitry.

In another aspect of the present invention, the duplexer filters are formed of acoustic wave filters or acoustic resonator filters. And, the switch circuitry includes one, or more, MEMS switches. Because separate duplexer filters are utilized, reduced-size filter assemblies are formable in contrast to use of a single, combined filter.

In another aspect of the present invention, the pass bands of the frequency-band subsets at which the separate duplexer filters are operable are selectably of frequency pass bands such that the duplexer parts of the separate duplexer filters are partially overlapping in frequency. Manufacturing tolerance levels are permitted to be reduced due to the ability to have overlapping pass bands of the separate duplexer parts. And, while guard bands are maintained between pass bands of each subset, the need otherwise maintain a guard band between the frequency-band set is obviated.

In one implementation, a duplexer filter assembly is provided for a mobile station operable at two separate frequency bands of a frequency-band set. The mobile station is selected to be operated upon transmit and receive channels of the frequency-band set. Upon the selection of the channels, to be used by mobile station, the filter duplexer associated with the selected channels is switchingly connected to the communication circuitry of the mobile station. The duplexer filters are constructed, for example, utilizing BAW/FBAR or SAW filters, and the filters are switchingly connected to the communication circuitry by way of MEMS switches.

In these and other aspects, therefore, a filter assembly, and an associated method, is provided for a two-way communication station. The communication station has communication circuitry selectably operable at a frequency-band set. A first duplexer filter is selectably coupled to the communication circuitry. The first duplexer filter exhibits frequency pass bands at frequencies of a first frequency-band subset of the frequency-band set. A second duplexer filter is also selectably coupled to the communication circuitry. The second duplexer filter exhibits frequency pass bands at frequencies of a second frequency-band subset of the frequency-band set. Switching circuitry is connected to both the first duplexer filter, to the second duplexer filter, and to the communication circuitry of the two-way communication station. The switching circuitry switchingly couples, at least alternately, the first duplexer filter with the communication circuitry and the second duplexer filter with the communication circuitry.

A more complete appreciation of the present invention and of the scope thereof can be obtained from the accompanying drawings that are briefly summarized below. The following description of the presently-preferred embodiments of the present invention, and the appended claims.

DETAILED DESCRIPTION

Figure 1:
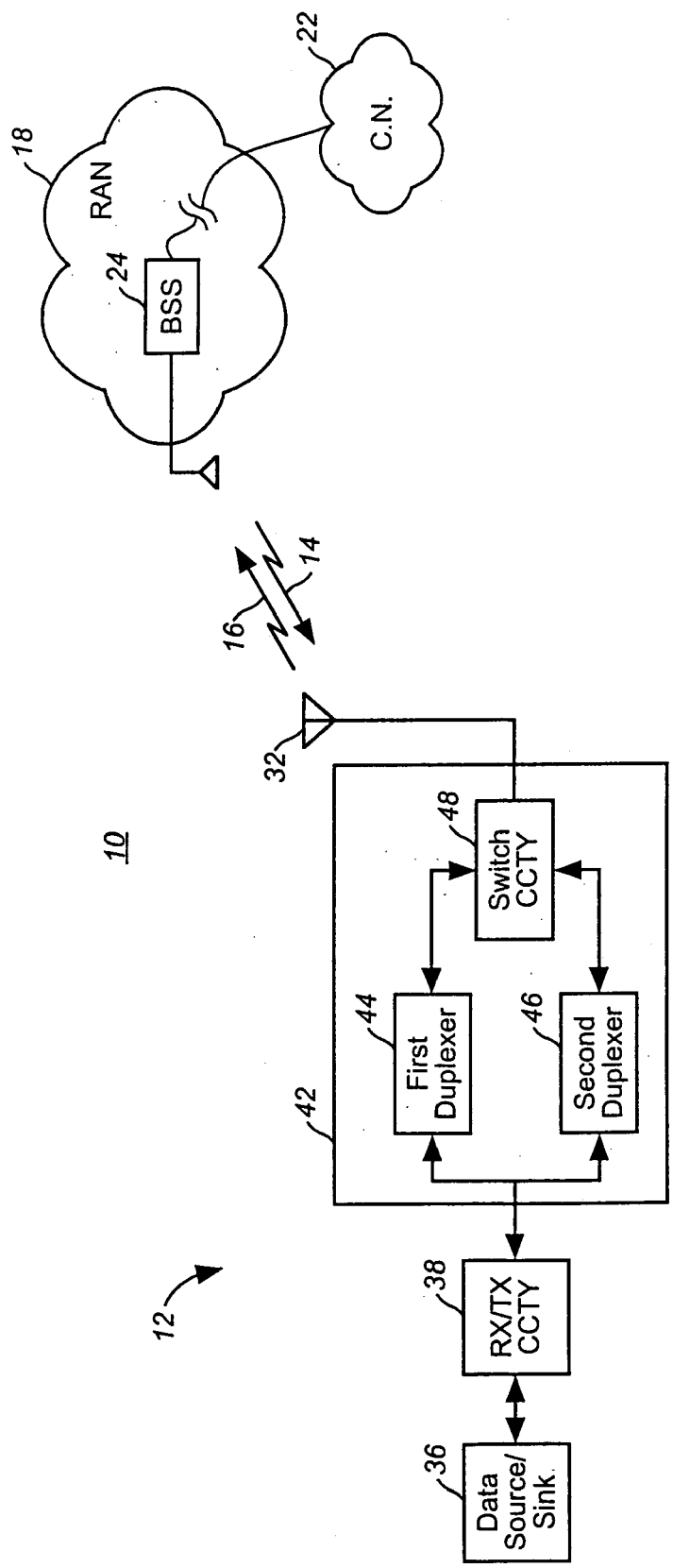
FIG. 1 illustrates a functional block diagram of a communication system having a mobile station capable of split-band operation and including a filter assembly of an embodiment of the present invention as a portion thereof.

Referring first to FIG. 1, a communication system, shown generally at 10, provides for radio communications with a mobile station 12. The mobile station communicates with a network part of the communication system by way of radio channels defined upon radio links, here represented by a forward-link 14 and a reverse-link 16. The network part of the communication system includes a radio access network (RAM) 18 and a core network (CN) 22. The radio access network is here shown to include a base station system (BSS) 24 that includes radio transceiver circuitry capable of two-way communication with the mobile station 12.

In the exemplary implementation, the communication system is representative of any of various types of cellular communication systems, such as a cellular communication system operable pursuant to a CDMA (Code-Division, Multiple-Access), a W-CDMA (Wide-Band CDMA), or a TDMA/GSM (Time-Division, Multiple-Access/General System for Mobile Communications) system. And, the communication system is representative of other communication systems that utilize separate transmit and receive bands, here referred to as split-band operation.

Split-band operation is, i.e., provided in communication systems implemented at the 1.9 GHz PCS (personal communication system) band allocated for cellular applications as well as generally, the systems proposed for implementation at other frequency bands, such as the 2.5 or 2.7 GHz bands. And, most communication system is also representative of any of various types of communication systems that provide for split-band operation.

The mobile station transmits signals at frequencies within a first band of the split-bands of operation, and receives signals at frequencies within a second band of split-bands. Frequency subsets are defined within the first and second bands. And, during a communication session, the mobile station is caused to be operated at a selected-frequency band subset.

Forward-link signals generated upon the forward-link channels 14 are detected at the mobile station within a receive frequency band, the first band, frequency band set. And, signals generated by the mobile station for communication upon reverse-link channels 16 are communicated within a transmit frequency band, the second band of the frequency band set. Because, pursuant to an embodiment of the present invention frequency subsets are defined, the mobile station is further defined at a second subset of the receive and transmit bands or at a second subset of the receive and transmit bands.

The mobile station 12 includes an antenna transducer 32 operable to transduce signals in to, and out of, electromagnetic form. Forward-link signals sent upon the forward-link channels 14 to the mobile station are detected at the mobile station and transduced in to electrical form by the antenna transducer. And, reverse link signals for communication upon the reverse-link channels 16 are transduced, out of electrical form and in to electromagnetic form, by the antenna transducer.

The mobile station also includes a data source/sink 36 at which information originated at the mobile station as sourced and to which information delivered to the mobile station is applied. And, the mobile station also includes transceiver circuitry (RX/TX CCTY) 38 that operates upon information originated at, or delivered to, the mobile station.

The transceiver circuitry forms a first part of the mobile station. And, the antenna transducer forms a second part of the mobile station. The first and second parts of the mobile station are interconnected by way of a filter assembly 42 of an embodiment of the present invention.

The filter assembly connects the parts of the mobile station together either by way of a first duplexer filter 44 or by way of a second duplexer filter 46. In alternate implementations, the filter assembly includes additional filter duplexers, capable of switched connection to the parts of the mobile station.

The duplexer filter 44 exhibits a first set of frequency pass bands. The set of frequency pass bands exhibited by the first duplexer define a first frequency-band subset of the frequency-band set.

And, the second duplexer filter exhibits a second set of frequency pass bands. When selection is made as to in which frequency-band subset in which the mobile station is to be operated, an appropriate one of the duplexer filters 44 or 46 is caused to be connected by switch circuitry 48 to form a path between the first and second parts of the mobile station. The switch circuitry 48 is also functionally represented in the figure and is implemented in any desired manner.

The duplexer filters 44 and 46 are formed of BAW/FBAR filters or SAW filters, in the exemplary implementations. Because separate filters are utilized, manufacturability of the filter assembly is simplified. And, because of the use of BAW/FBAR and SAW filters, the package size of the assembly is reduced relative to use of conventional, ceramic duplexers.

Figure 2:
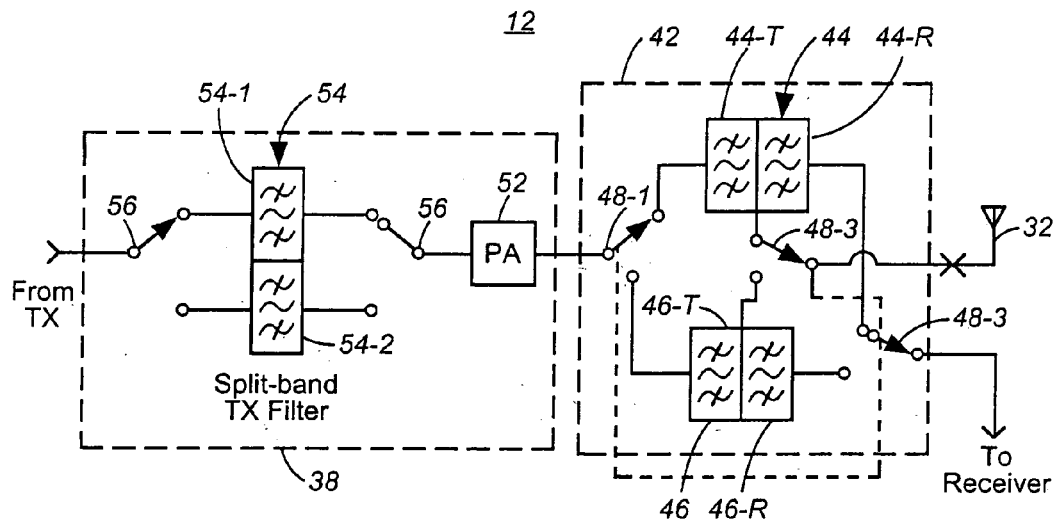
FIG. 2 illustrates a functional block diagram of the filter assembly of an embodiment of the present invention that forms a portion of the mobile station shown in FIG. 1.

FIG. 2 illustrates a portion of the mobile station 12, including the filter assembly 42 of an embodiment of the present invention. Here, again, the filter assembly 42 is positioned between first and second parts of the mobile station. Here, a portion of the transceiver circuitry is shown to include a power amplifier 52 and a transmit filter 54. The transmit filter 54 is a split-band filter having first and second parts 54-1 and 54-2. Here, one or the other, of the first and second parts are connected to form part of a communication path through operation of a switch 56.

The duplexer filters 44 and 46 are here each shown to include transmit halves and receive halves, indicated by 44-T, 46-T, 44-R, and 46-R, respectively.

One, or the other, of the duplexer filters 44 and 46 is connected to form part of a communication path at the mobile station, depending upon which of the frequency-band subsets in which the mobile station is selected to be operable. Here, the switch circuitry 48 is formed of switch elements 48-1, 482, and 48-3, each here forming single-pole double-throw switch elements. The switch elements are switchingly positioned to connect one, or the other, of the duplexer filters to the first and second parts of the mobile station. In the exemplary implementation, a control signal generated on the line 52, is applied to each of the switch elements to cause the switch elements to operate in unison.

Figure 3:
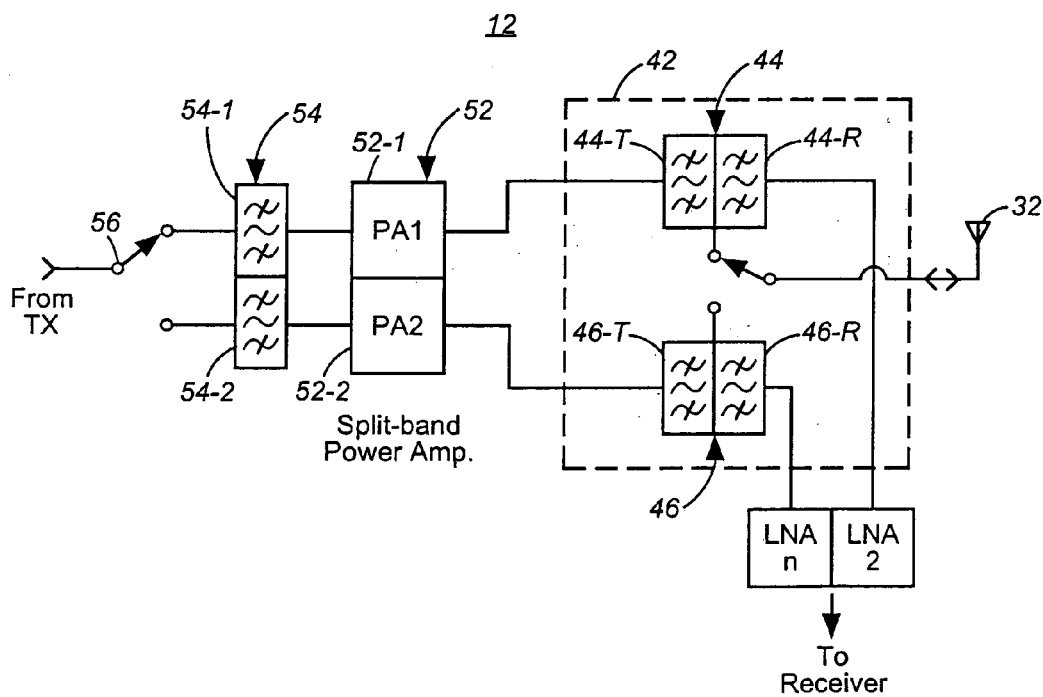
FIG. 3 illustrates a functional block diagram, similar to that shown in FIG. 2 but of an alternate embodiment of the present invention.

FIG. 3 also illustrates portions of the mobile station 12, including the filter assembly 42 of an embodiment of the present invention. Here again, the transceiver circuitry includes a power amplifier 52 and a split-band transmit filter 54. Here, separate power amplifiers 52-1 and 52-2 are utilized. And, again, the split-band transmit filter includes first and second parts 54-1 and 54-2.

Here, a single switch element 56 connects one part, or the other part, of the transmit filter 54 and also the power amplifier into the communication path, pursuant to which the mobile station is operable. Separate lines extend between the power amplifiers 52-1 and 52-2 to separate ones of the duplexer filters 44 and 46. Again, each of the duplexer filters includes a transmit filter and a receive filter, here shown at 44-T, 46-T, 44-R, and 46-R, respectively.

In this embodiment, the switch circuitry is formed of a single switch element 48-1 that connects one, or the other, of the duplexer filters into the communication path pursuant to which the mobile station is operable.

Figure 4:
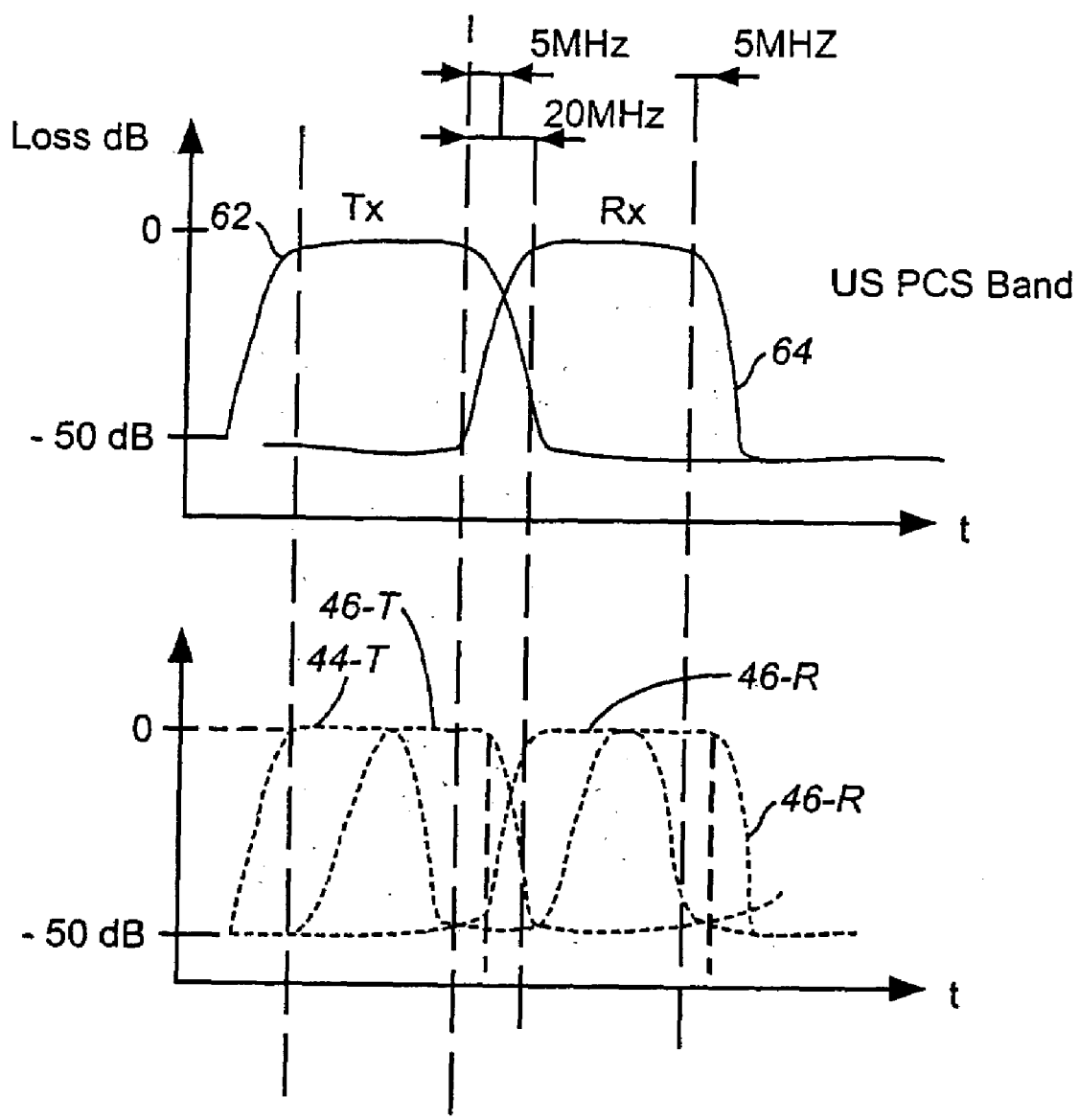
FIG. 4 illustrates a graphical representation showing the frequency response of an exemplary duplexer of an embodiment of the present invention.

FIG. 4 illustrates graphical representations of the frequency bands in which the duplexer filters of the filter assembly 42, shown in previous figures, are operable. The top-most (as shown), representation, is of a 1.9 GHz PCS band illustrating the pass bands 62 and 64 of the transmit and receive filters of an exemplary filter duplexer. That is, the pass bands 62 and 64 define the frequency-band set of the communication system.

The bottom-most (as shown) representation illustrates the pass bands of the duplexer filters 44 and 46 of an embodiment of the present invention. Here the pass bands are referenced by the same reference numerals by which the filter parts of the duplexer filters are referenced. Analysis of the graphical representation indicates that the pass bands of the filter parts of the respective transmit and receive parts of the duplexers overlap in frequency. Here also, the 20 MHz separation between the pass bands of the transmit and receive halves 44-T and 44-R and 46-T and 46-R of the respective filters are maintained. But, the 20 MHz spacing between the bands 62 and 64 need not be maintained. Viz, through use of the filter assembly, the otherwise unused 20 MHz frequency space, can here be utilized upon which to define channels. Five MHz extensions proposed to the 1.9 MHz systems are readily attainable. And, proposals for systems at the 2.5 and 2.7 GHz bands can utilize all of the allocated and width, avoiding the otherwise existing need to maintain a guard band between the transmit and receive bands.

Figure 5:
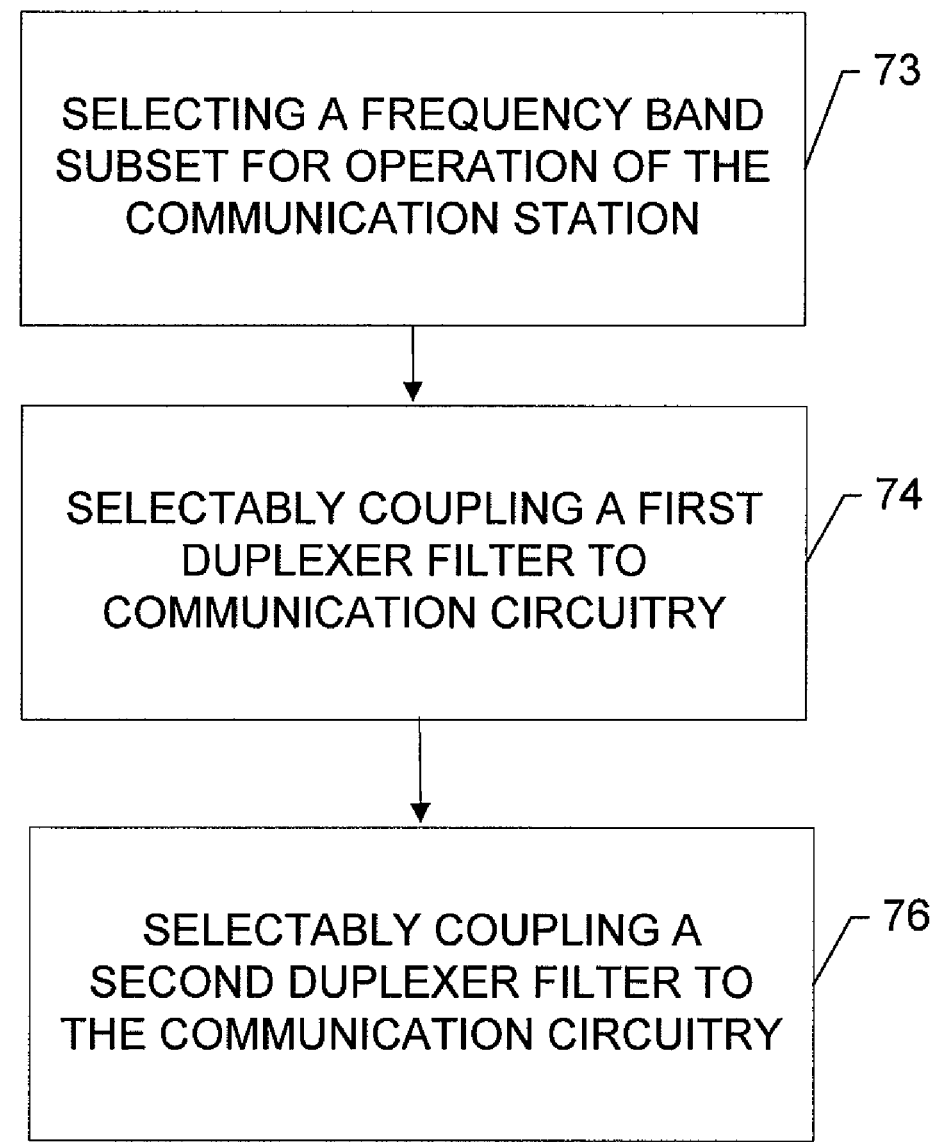
FIG. 5 illustrates a method flow diagram listing the method of operation of an embodiment of the present invention.

FIG. 5 illustrates a method flow diagram, shown generally at 72, of the method of operation of an embodiment of the present invention. The method 72 filters signals generated during operation of a 2-way communication station having communication circuitry selectably operable at a frequency-band set.

Subset of the method includes a preliminary step, indicated by the block 73, of selecting in which of a first frequency-band subset and a second-frequency band subset in which the communication station is selected to be operated.

Then, and as indicated by the block 74, a first duplexer filter is selectably coupled to the communication circuitry. The first duplexer filter exhibits frequency pass bands at frequencies of the first frequency-band subset of the frequency-band set. And, as indicated by the block 76, a second duplexer filter is selectably coupled to the communication circuitry. The second duplexer filter exhibits frequency pass bands at frequencies of the second frequency-band.

Thereby, a manner is provided by which to filter signals at a communication station, such as a mobile station, capable of split-band operation, at disparate frequency-band sets. High levels of rejection are provided while permitting the filter assembly at which the signals are filtered to be maintained in a package of small physical dimensions.

The previous descriptions are of preferred examples for implementing the invention, and the scope of the invention should not necessarily be limited by this description. The scope of the present invention is defined by the following claims:

I claim:

1. A filter assembly for a two-way communication station having communication circuitry selectably operated at a frequency-band set, said filter assembly comprising:
   a first duplexer filter selectably coupled to the communication circuitry, said first duplexer filter exhibiting frequency pass bands at frequencies of a first frequency-band subset of the frequency-band set;
   at least a second duplexer filter also selectably coupled to the communication circuitry, at least said second duplexer filter exhibiting frequency pass bands at frequencies of at least a second frequency-band subset of the frequency-band set; and
   a single switch connected to both said first duplexer filter, to said second duplexer filter, and to the communication circuitry of the two-way communication station, said single switch for switchingly coupling said first duplexer filter with receive circuitry and transmit circuitry of the communication circuitry and a least said second duplexer filter with the communication circuitry,
   wherein said first duplexer filter comprises a first-duplexer transmit filter part and a first-duplexer receive filter part, the first duplexer transmit filter part coupled to the transmit circuitry and the first-duplexer receiver filter part coupled to the receive circuitry when said single switch couples said first duplexer filter with the communication circuitry.

2. The filter assembly of claim 1 wherein said second filter duplexer comprises a second-duplexer transmit filter part and a second-duplexer receive filter part, the second-duplexer transmit filter part coupled to the transmit circuitry and the second-duplexer receive filter part coupled to the receive circuitry when said single switch couples said second duplexer filter with the communication circuitry.

3. The filter assembly of claim 1 wherein said single switch couples the communication circuitry together with said first duplexer filter when the communication station operates to communicate at frequencies within the first frequency-band subset.

4. The filter assembly of claim 1 wherein said single switch couples the communication circuitry together with said second duplexer filter when the communication station operates to communicate at frequencies within the second frequency-band subset.

5. The filter assembly of claim 1 wherein said first duplexer filter comprises a bulk acoustic wave resonator.

6. The filter assembly of claim 1 wherein said first duplexer filter comprises a SAW (surface acoustic wave) filter.

7. The filter assembly of claim 1 wherein said single switch comprises a semiconductor switch elements.

8. The filter assembly of claim 1 wherein said single switch comprises a Micro Electro Mechanical system (MEMS) switch elements.

9. The filter assembly of claim 1 wherein said single switch comprises a single-pole double-throw switch element.

10. The filter assembly of claim 1 wherein the communication circuitry comprises a first side part and a second side part and wherein operation of said single switch switchingly couples a selected one of said first duplexer filter and said second filter duplexer in-line between the first side part and the second side part, respectively, of the communication circuitry.

11. The filter assembly of claim 10 wherein said single switch includes a first and side portion, the first and side portion of said single switch connected to the second side part of the communication circuitry.

12. The filter assembly of claim 1 wherein the frequency passbands exhibited by said first duplexer filter and the frequency passbands exhibited by said second duplexer filter partially overlap.

13. A filter assembly for a two-way communication station having communication circuitry selectably operated at a frequency-band set, said filter assembly comprising:
   a first duplexer filter selectably coupled to the communication circuitry, said first duplexer filter exhibiting frequency pass bands at frequencies of a first frequency-band subset of the frequency-band set;
   at least a second duplexer filter also selectably coupled to the communication circuitry, at least said second duplexer filter exhibiting frequency pass bands at frequencies of at least a second frequency-band subset of the frequency-band set; and switching circuitry connected to both said first duplexer filter, to said second duplexer filter, and to the communication circuitry of the two-way communication station, said switching circuitry for switchingly coupling, at least alternately, said first duplexer filter with the communication circuitry and at least said second duplexer filter with the communication circuitry, wherein said switching circuitry comprises a first single-pole double-throw switch, having a first end side portion, the first end side portion thereof connected to the second side part of the communication circuitry, said first switch further defining a second side portion having switch contacts, a first switch contact connected to said first duplexer filter and a second switch contact connected to said second duplexer filter.

14. The filter assembly of claim 13 wherein said switch circuitry further comprises a second single-pole, double-throw switch having a first end side portion and a second end side portion, the first end side portion thereof connected to the first side part of the communication circuitry and the second end side portion thereof having switch contacts connected to said first duplexer filter and to said second duplexer filter, respectively.

15. The filter assembly of claim 14 wherein the first switch and the second switch of said switch circuitry are actuable together in unison.

16. A method for filtering signals generated during operation of a two-way communication station having communication circuitry selectably operable at a frequency-band set, said method comprising:

selectably coupling a first duplexer filter to receive circuitry and transmit circuitry of the communication circuitry via a single switch, the first duplexer filter exhibiting frequency passbands at frequencies of a first frequency-band subset of the frequency-band set when the communication station is operated at frequencies of the first frequency band subset; and selectably coupling a second duplexer filter to the communication circuitry via the same single switch, the second duplexer filter exhibiting frequency passbands at frequencies of a second frequency-band subset of the frequency-band set when the communication station is operated at frequencies of the second frequency band subset, wherein the first duplexer filter selectably coupled during said operation of selectably coupling the first duplexer filter is switchingly connected to the communication circuitry by a single switch and wherein said operation comprises positioning the single switch in a first switch position that connects the first duplexer filter to the communication circuitry.

17. The method of claim 16 wherein the second duplex filter selectably coupled during said operation of selectably coupling the second duplexer filer is also switchingly selected to the communication circuitry by the single switch, and wherein said operation of selectably coupling comprises positioning the single switch in a second switch position that connects the second duplexer filter to the communication circuitry.

18. A method for filtering signals generated during operation of a two-way communication station having communication circuitry selectably operable at a frequency-band set, said method comprising:

selectably coupling a first duplexer filter to the communication circuitry, the first duplexer filter exhibiting frequency passbands at frequencies of a first frequency-band subset of the frequency-band set when the communication station is operated at frequencies of the first frequency band subset; and selectably coupling a second duplexer filter to the communication circuitry, the second duplexer filter exhibiting frequency passbands at frequencies of a second frequency-band subset of the frequency-band set when the communication station is operated at frequencies of the second frequency band subset, wherein the first duplexer filter selectably coupled during said operation of selectably coupling the first duplexer filter is switchingly connected to the communication circuitry by and wherein said operation comprises positioning switch circuitry in a first switch position that connects the first duplexer filer to the communication circuitry, wherein the second duplex filter selectably coupled during said operation of selectably coupling the second duplexer filer is also switchingly selected to the communication circuitry by the switch circuitry, and wherein said operation of selectably coupling comprises positioning the switch circuitry-in a second switch position that connects the second duplexer filter to the communication circuitry, and further comprising the preliminary operation of selecting which of the first frequency-band subset and the second frequency-band subset in which the communication station is selected to be operated.

* * * * *